United States Patent Office 3,033,840
Patented May 8, 1962

3,033,840
COPOLYMERS OF ETHYLENE AND VINYL ALKYL ETHERS
Howard William Strauss, Groves, Tex., assignor to E. I. du Pont de Nemours and Company, Wilmington, Del., a corporation of Delaware
No Drawing. Filed Nov. 20, 1959, Ser. No. 854,263
4 Claims. (Cl. 260—88.1)

This invention relates to the production of normally solid polymers of vinyl alkyl ethers and of film thereof having improved gloss.

It has been known heretofore that vinyl alkyl ethers may be copolymerized with ethylene under moderate pressure to yield oily materials, as shown in U.S. Patent No. 2,748,170 issued to G. J. Benoit, Jr., and A. D. Abbott on May 29, 1956, which are highly useful as lubricating compositions. Normally solid copolymers of ethylene and methyl vinyl ether having good film-forming properties have not heretofore been made.

It is an object of the present invention to prepare normally solid copolymers of methyl vinyl ethers with ethylene. It is also an object of the present invention to produce films substantially of polyethylene modified to improve the gloss, which also have enhanced toughness. Other objects will become apparent from the following discussion.

The above objects are achieved by copolymerizing normally solid copolymers of ethylene with methyl vinyl ether employing a free radical catalyst such as oxygen, an organic peroxide or hydroperoxide. These copolymers can be converted into films by blowing processes such as that described by Fuller in U.S. Patent No. 2,461,975, issued February 15, 1949.

It has been found that in general vinyl alkyl ethers act as efficient chain transfer agents for free radicals. When such ethers are introduced into an ethylene polymerization reaction in an attempt to form copolymers, they suppress the molecular weight. It has, therefore, been found that when polymers of these ethers are prepared having a molecular weight comparable with that of commercially useful polyethylenes, in general such polymers contain so little of the co-monomer that the properties are not noticeably affected. On the other hand, in the case of vinyl methyl ether, it has been found that the chain transfer efficiency is very nearly the same as for propane and that solid thermoplastic copolymers having a wide range of compositions can be made having extremely useful properties by merely replacing part of the ethylene in a conventional free radical synthesis with vinyl methyl ether. The molecular weight, as indicated by the melt index, of the product may be readily controlled by the injection of low molecular weight paraffinic hydrocarbons such as propane, which act as telogens. In general, resins having a melt index in the range of M.I. 0.1 to M.I. 10 are particularly useful for the production of films.

Copolymers of vinyl methyl ether and ethylene made by polymerizing a mixture containing substantially the percentage of vinyl methyl ether desired in the final product with a complemental proportion of ethylene at a pressure in the range between 12,000 and 30,000 pounds per square inch, at a temperature in the range between 150 to 240° C. and in the presence of a minor amount of a free radical initiator generally between 0.01 and 1% by weight.

Free radical initiators suitable for the practice of this invention are those initiators which yield free radicals at the temperature of reaction, and which are effective in the polymerization of ethylene alone. A detailed discussion and bibliography has been given by Raff and Allison, volume XI of the "High Polymers" series, monograph entitled "Polyethylene," published by Interscience Publishers, Inc., New York (1956), Library of Congress Catalog Number 56-8227. The conditions necessary for the manufacture of the copolymers are essentially those of the homopolymer. The very slight telogenic activity of the vinyl methyl ether can be readily offset if propane telogen is used to control the molecular weight by slight reduction of the propane.

The compositions of this invention are generally similar in properties and structures to conventional free radical polyethylene, containing short branches which vary somewhat in number with the temperature and pressure of synthesis; higher temperature and lower pressure favoring the production of such short branches. The concentration of short branches is not generally in excess of 4–5 per 100 methylene groups. In general, the effect of such branches on the physical properties is to decrease the density measured at 25° C. to a value less than 0.94 gm./cc. and generally between 0.90 and 0.93. The density also depends on the concentration of the co-monomeric vinyl methyl ether present in the copolymer, a higher concentration of vinyl methyl ether tending to give a product of lower density. In general, it is necessary to introduce at least 0.5 mole percent of the vinyl methyl ether as co-monomer in the resin in order to affect the properties of the base polymer. In a preferred embodiment, the copolymer contains from 0.5 to 10 mole percent of methyl vinyl ether. It will be realized, however, that compositions containing higher proportions of vinyl methyl ether can also be made.

The products formed by the above process were found to be extremely useful for the manufacture of films by conventional film-forming techniques which are well-known in the art. Such films have a greater degree of gloss than films of polyethylenes having the same melt index but without the addition of vinyl methyl ether co-monomer. Moreover, blown film containing vinyl methyl ether in minor proportions is surprisingly tougher than unmodified polyethylene of like molecular weight.

The invention is further illustrated by the following examples, it being understood that these examples are given merely to illustrate this invention.

*Example I*

Ethylene was fed to a high-pressure reactor at a pressure of 22,000 p.s.i. at a feed temperature of 60° C. An initiator of tertiary butyl peroxyisobutyrate was injected into the reactor at a rate of 0.3 lb. per 1000 lbs. of polymer produced. The reactor temperature was maintained at 187° C. and the melt index of the product polyethylene, determined by ASTM method designation D–1238–52–T, was maintained at a level of 1.7 by the addition of 8.4 mole percent of propane telogen in the ethylene feed.

The product of the reaction was continuously withdrawn, the ethylene removed by flashing off in separators on reduction of pressure and the resultant molten polyethylene was extruded from a melt extruder. This material was used as a standard with which to compare materials having various proportions of the copolymer.

Using the same conditions of temperature, pressure and initiation, 1.7 mole percent of vinyl methyl ether was introduced into the reactor. The gas removed from the effluent material also contained 1.7 mole percent of vinyl methyl ether, and the resin likewise was found to contain 1.7 mole percent of the co-monomer. The amount of propane telogen employed was 7.0 mole percent and the melt index of the resultant copolymer was found to be 2.2, substantially the same as for the polyethylene without the addition of the co-monomer.

The density at 25° C. was determined by the method of hydrostatic weighing after annealing at 100° C. for one hour. For the polyethylene the value found was 0.9283 gm./cc. and for the copolymer 0.9276 gm./cc.

The tensile properties showed that the copolymers had unimpaired tensile behavior. The yield strength determined by ASTM method designation D-412-51-T was 2010 lbs./square inch, the tensile strength was 1610 lbs./square inch determined by ASTM method designation D-412-51-T, and the elongation was 330%. For the copolymer the yield strength was 2020 lbs./square inch, the tensile strength was 1730 lbs./square inch, and the elongation was 450%.

Blown film was produced from the two resins by a method similar to that disclosed by Fuller in U.S. Patent 2,461,975 issued February 15, 1949, using a die temperature of 160° C. The following properties were determined:

|  | Polyethylene | Ethylene-Vinyl Methyl Ether Copolymers |
| --- | --- | --- |
| Transparency | 18 | 42 |
| Haze, percent | 8.7 | 8.1 |
| Gloss/mil | 28 | 36 |
| Bag Drop Tear, Inches | 14.4 | 14.5 |
| Block, lb./8 sq. in | 0.2 | 0.3 |

Transparency was determined by measurment of the light transmitted through the sample at angles of 0° to ±0.05° from the incident beam with a Scattermaster transparency meter, model 2, made by Manufacturer's Engineering and Equipment Company, and haze is a measure of light scattered by the sample at angles more than 2½° from the incident beam with a Gardner pivotable sphere hazemeter, model AU-10.

Gloss was measured at 20° angle incident light with a Gardner portable gloss meter, the units of gloss being equal to 1/1000 of the light reflected by a perfect reflector. The bag drop tear test is a test of film toughness which has been designed to approximate closely the type of stress conditions encountered in actual use. The test is performed by notching the folds of a bag fabricated from the test material, dropping the bag filled with plastic beads from a predetermined height, and measuring the longest tear in the bag. The folds have been found to be the weakest part of the bag. The height in inches is determined from the formula 180/wt. of filled bag in pounds.

Block was determined by the force in pounds required to separate 8 sq. in. of film as fabricated. The force is measured in the slip direction (parallel to the plane of the films), and the separation rate is 20 in./min.

*Example II*

A sample of polyethylene and a sample of a vinyl methyl ether copolymer were manufactured using the process of Example I with the following conditions:

|  | Polyethylene | Ethylene-Vinyl Methyl Ether Copolymers |
| --- | --- | --- |
| Pressure, p.s.i | 22,000 | 22,000 |
| Reactor Temp., ° C | 215 | 214 |
| Propane Telogen, Mole percent | 6.0 | 4.6 |
| Tertiary Butyl Peroxy-isobutyrate Initiator, lbs./1,000 lbs. Resin | 0.3 | 0.4 |
| Vinyl Methyl Ether in Feed, Mole percent |  | 5.3 |
| Ether in Effluent, Mole percent |  | 5.2 |
| Ether in Resin, Mole percent |  | 6.0 |

The resins, thus manufactured, had the following properties, which were determined by the methods described in Example I.

|  | Polyethylene | Ethylene-Vinyl Methyl Ether Copolymers |
| --- | --- | --- |
| Melt Index | 2.0 | 2.3 |
| Density, gms./cc. | 0.9249 | 0.9225 |
| Yield Strength, p.s.i. | 1,810 | 1,460 |
| Tensile Strength, p.s.i. | 1,970 | 1,890 |
| Elongation, percent | 600 | 610 |

Film properties:

|  | Polyethylene | Ethylene-Vinyl Methyl Ether Copolymers |
| --- | --- | --- |
| Transparency | 49 | 32 |
| Haze, percent | 9.1 | 8.2 |
| Gloss/mil | 35 | 43 |
| Bag Drop Tear, Inches | 13.7 | 1.8 |
| Block, lbs./8 sq. inches | 0.2 | 0.4 |

Compositions containing other proportions of ethylene and methyl vinyl ethers may be made by varying the composition of the feed gas, the composition of the resultant polymer being due to that of the feed.

The melt index may be varied by (1) varying the condition of synthesis, a lower synthesis temperature tending to decrease the melt index or increase the molecular weight, a higher pressure at constant temperature has also been found to increase the molecular weight or (2) by changing the concentration of propane or other telogen; an increased amount of telogen leading to a lower molecular weight and a higher melt index. Resins are generally manfactured with a melt index in the range from 0.1 to 20, although resins may be carefully employed for some purposes which have a melt index higher or lower than the aforesaid range.

Attempts were also made to incorporate higher vinyl alkyl ethers into solid free-radical polyethylene as co-monomers, but on account of the high chain transfer reactivity of these materials in comparison with ethylene, it was found to be impossible to manufacture such co-polymers with sufficient proportion of co-monomer measurably to affect the properties. For example, in the case of vinyl methyl ether as described in Examples I and II above, the chain transfer activity of the ether is 1.0 and 0.3 respectively, measured as the propane concentration equivalent to 1 mole percent vinyl methyl ether. On the other hand, in the case of vinyl isobutyl ether, the chain transfer activity was 67 measured in the same units.

The copolymer resins produced according to this invention are particularly valuable for the production of blown film, the addition of the co-monomer improving the optical properties without detracting from the desirable mechanical properties.

It will be obvious to those skilled in the art that many modifications of this invention may be made without departing from the spirit or scope thereof; thus, small amounts of antioxidants may be added to the composition of this invention in order to improve the stability to oxidation, or pigments may be compounded with these resins in order to impart a more desirable appearance.

I claim:
1. A normally solid copolymer of ethylene and methyl vinyl ether further characterized by a density less than 0.93 gm./cc., a melt index in the range from 0.1 to 10, containing a molar percentage of vinyl methyl ether polymerized therein in the range from 0.5 to 10 moles percent.

2. The composition of claim 1 in the form of a pellicle.

3. A process for the manufacture of copolymers of vinyl methyl ether and ethylene containing a molar percentage of vinyl methyl ether in the range of from 0.5 to 10 moles percent which comprises polymerizing a mixture containing substantially the percentage of vinyl methyl ether desired in the final product with a complemental proportion of ethylene at a pressure in the range between 12,000 and 30,000 pounds/square inch, at a temperature in the range between 150 to 240° C. and in the presence of a minor amount of a free radical initiator effective for the polymerization of ethylene alone.

4. The process of claim 3 wherein the said free radical initiator is tertiary butyl peroxyisobutyrate.

References Cited in the file of this patent

UNITED STATES PATENTS

| | | |
|---|---|---|
| 2,388,178 | Peterson | Oct. 30, 1945 |
| 2,920,067 | Mortimer | Jan. 5, 1960 |

UNITED STATES PATENT OFFICE
CERTIFICATE OF CORRECTION

Patent No. 3,033,840

May 8, 1962

Howard William Strauss

It is hereby certified that error appears in the above numbered patent requiring correction and that the said Letters Patent should read as corrected below.

Column 4, line 72, for "polymerized" read -- copolymerized --.

Signed and sealed this 28th day of August 1962.

(SEAL)
Attest:

ESTON G. JOHNSON
Attesting Officer

DAVID L. LADD
Commissioner of Patents